2,945,620
CENTRIFUGAL FLUID COMPRESSOR WITH AXIAL DELIVERY

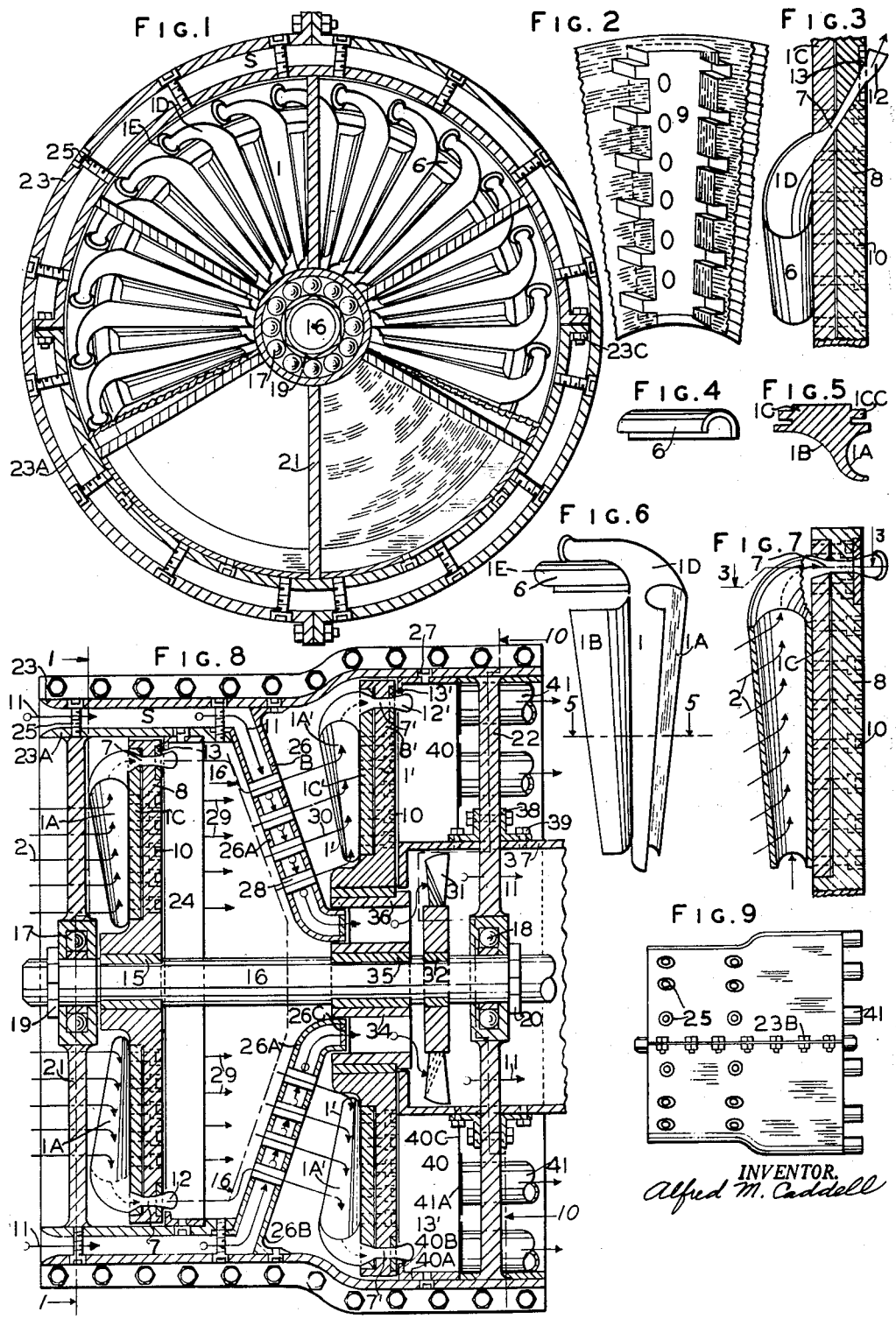

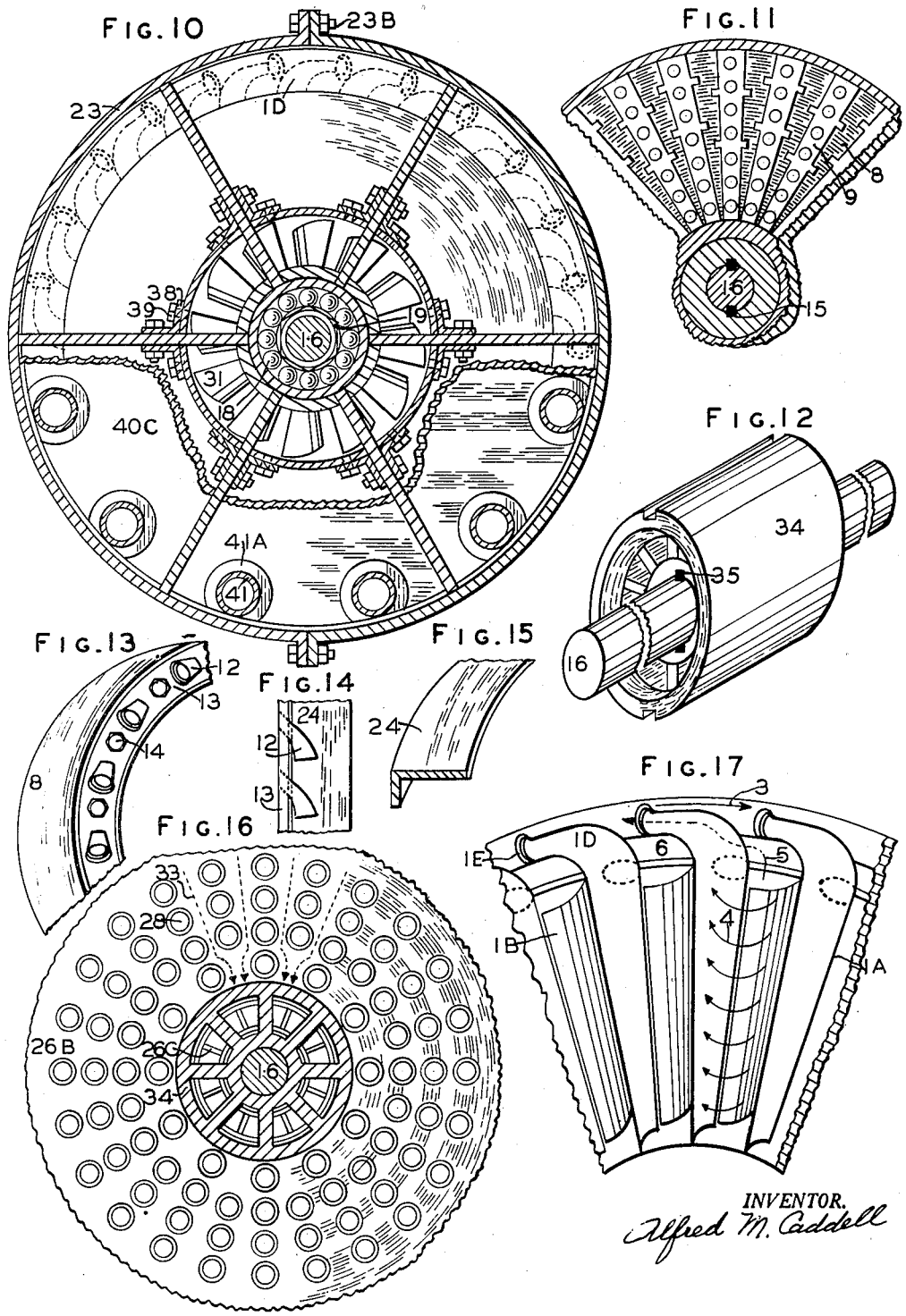

Alfred M. Caddell, 3117 N. Broad St., Philadelphia, Pa.

Filed Apr. 11, 1956, Ser. No. 577,567

10 Claims. (Cl. 230—127)

This application is in part a continuation of the applications entitled Centrifugal-Axial Reaction Assisted Blower, Serial No. 372,525, filed August 5, 1953, now abandoned, and Energy Compensating Centrifugal-Axial Compressor, Serial No. 473,314, filed December 6, 1954, now abandoned.

As in the foregoing applications, this invention has to do with improving the efficiency of a centrifugal compressor and simultaneously overcoming its principal drawback—that of a large frontal area.

For example, in the gas turbine field there is an absolute need for a large output of air at a high-compression ratio and need for an increase in compression ratio stands to become even greater as the gas turbine art evolves. As a measure of the compressor's importance, it has been demonstrated that with an increase in the over-all efficiency of the compressor from 70 to 75 percent, the 5 percent gain raised the cycle efficiency of a test engine approximately 20 percent. Clearly, therefore, an improvement in compressor efficiency reflects an improvement in powerplant efficiency that extends far beyond that of the compressor itself.

At present, there are two distinct types of compressors employed in the gas turbine field—centrifugal and axial. In the centrifugal type the over-all diameter is much greater than that of the axial type due to the employment of a diffuser which extends radially from the wheel a distance half again as far as the wheel itself, which increase in radius is for the purpose of converting centrifugal velocity in the air into pressure. Whereupon ducts that connect the diffuser at an angle greater than 90 degrees convey the air at progressively decreasing radii for entry into the engine's combustors.

As an example of what such an increase in over-all diameter of a centrifugal compressor means in an aircraft, the diameter of a compressor wheel of a certain make of engine is 36 inches while the diffuser and ducts extend outwardly another 18 inches, totalling a 54-inch diameter which, in travel through air, causes prohibitive parasitic resistance.

A comparative test

Compared to the axial type, this increased diameter stands out in a centrifugal compressor as its greatest disadvantage. In the realm of high flight speed, large frontal area looms so important that a reduction in compressor diameter may well result in improved propulsive efficiency that will far outweight the advantage of a better specific fuel consumption or a higher thrust. A comparison of two basically similar gas turbine engines, both of which employed axial compressors, affords ample proof of this fact.

These powerplants were mounted in identical airframes so that their relative flight efficiencies could be most accurately ascertained. One engine developed a thrust of approximately 2,000 pounds and the other, which had a 4-inch smaller diameter, gave a thrust of 1,800 pounds. But the smaller engine propelled its airframe at the same flight speed attained by the larger one. Which proves that the 2-inch all-round increase in diameter exacted a heavy toll in speed and fuel and, of course, additional weight must be chalked up against the larger powerplant.

Advantages of a centrifugal compressor

Regardless of the present large diameter handicap associated with centrifugals, the advantages that they exhibit, when compared to the performance of axial compressors of similar output capacity are, nevertheless, indisputable.

For one thing, the centrifugal compressor has a wider effective operating range than the axial type and is eminently more suitable when variable and quick changes in speeds and loads are demanded.

The centrifugal type delivers its rated output more consistently.

It is lighter and cheaper to manufacture and is more robust in operation than the axial type.

It can be rotated at higher peripheral speeds and is not affected by atmospheric conditions, such as icing, to the same extent as is an axial compressor.

For a given poundage of air output it has a lighter constructional weight.

It will deliver higher compression ratios than the axial type which factor, as previously mentioned, causes an increase in powerplant efficiency all out of proportion to the increase in efficiency of the compressor itself. With a single stage wheel it is possible to attain a 4 to 1 compression ratio as compared to about 1 to 1½ for a single stage of axial compression. Further, an even higher ratio may be attained by increasing the wheel's peripheral velocity, in which event the pressure ratio increases approximately on the order of the square of the peripheral velocity. Or, as an alternative to higher peripheral speeds, if interstage cooling is employed, higher compression ratios may also be safely attained by adding one or more compressor wheels in a powerplant installation.

The importance of being able to increase the compression ratio of combustion air without lowering the cycle efficiency of the engine, which is affected by the greatly increased temperature of compressed air, is well known. Take the case of a turbojet having 5,000 lbs. thrust at a compression ratio of 4.5 to 1. Upon increasing this ratio to 7.45 to 1, a matter of 65 percent, the thrust increased to approximately 9,300 lbs., representing a gain of 81 percent. At the same time, the fuel comsumption decreased from 1.15 per lb. of thrust to less than 0.9 lb. per hour per pound of thrust, thus registering a double gain. Obviously, to attain this result, the increase in compressed air temperature had to be overcome by interstage cooling.

Axial compressors

With the axial compressor the compressed air flow is, of course, distinctly axial and, therefore, its construction can be held within smaller over-all limits. At each stage of compression the air is accelerated to a prescribed compression ratio, whereupon its direction is reversed by stator blades mounted on the inner side of the compressor's casing between the compressor's rotatable blades. This reversing and acceleration of flow at an ever-increasing compression ratio goes on for a number of stages, sometimes totalling 16. But due to this type of compressor's sluggishness in response to throttle control, blade stalling often occurs. Sufficient air is prevented from entering the combustors, which brings about flame-out. Restarting an engine in flight is always perilous, due to the inadequacy of either air or fuel and consequent non-ignition of that mixture. In desperation to get re-started, the pilot may easily flood the combustors and should ignition then occur a disastrous explosion results.

The principal object of this invention is, therefore, to make available a compressor that incorporates in its construction the best features of the radial and axial types. The compressor described herein compresses air radially and delivers its output axially at a radius within the peripheral boundary of the wheel, thus obviating the necessity of a diffuser and conveying ducts, such as those now in use, to convey air under pressure to the combustors.

Another object is to effect high-speed rotation of the compressor at a minimum cost of power taken from the engine. In present-day installations, the power input requirements of a compressor are great—approximately three-fourths of that developed by a turbine. In a number of engines the demand amounts to 60 pounds per second, necessitating the employment of 6,000 H.P. to deliver this weight of air to the combustors at a 4 to 1 compression ratio. In jet installations, this is not serious for the combustion gas, mixed with a great volume of dilution air, produces rearward thrust to move the craft forward. But in gas turbines employing energy for shaft take-off, such power drain virtually precludes their use for industrial purposes.

A third object is to make available constructional features that convert centrifugal force built up in the air during rotation into reactive drive of the compressor wheel, thus minimizing the power required from the engine for its rotation.

Upon leaving the blades of a centrifugal compressor, the air has a velocity greater than that of the peripheral speed of the wheel. Which suggests that inasmuch as 100 H.P. are required to compress one pound of air per second, the centrifugal velocity of the air upon leaving the blades represents, excluding frictional losses, approximately that amount of power; which also suggests that if, besides effecting compression, the centrifugal velocity imparted to the air were put to use within the compressor wheel to create reactive drive prior to its discharge and also, upon discharge externally to the wheel in a direction opposite to that of rotation, the total power required to compress a given poundage of air, compared to that now required, would be drastically reduced.

A fourth object is to present a vane surface that takes advantage of maximum ram pressure that is built up in the air during forward flight. In high-speed aircraft, ram pressure of such encountered air becomes of paramount importance. It is so great that at speeds of 375 miles per hour the thrust curve, instead of falling, commences to rise, continuing upwardly as flight speed increases. If this invention is employed with an engine the power output of which is to be used for shaft take-off purposes, such as for turning a propeller, the input requirements would probably be cut in half for a stated poundage of air at this flight speed. Therefore, harnessing to a maximum extent the windmilling effect of ram air, which is made possible by the herein described concavo-concave structure, constitutes a major goal of this invention.

A fifth object is to obtain maximum benefit from reactive drive by causing the compressed air to discharge from the compressor at a radius where leverage is greatest—at the periphery of the wheel.

A sixth object is to provide an air compressor having less weight and size per output capacity than any compressor extant. Inasmuch as a compressor comprises a large part of the total engine weight, savings along these lines would translate into valuable payload gains. For example, a 5 percent saving in weight on a large jet transport making the New York to London crossing would translate into approximately 6000 lbs. in fuel requirements alone; which 6000 lbs. represents about 22 pay passengers per trip.

A seventh object is to prevent to as great as extent as possible the power-consuming effects of vacuum drag. As is well-known, any object that moves through the air brings into being a most pronounced vacuum in its wake. And obviously, the faster the movement of that object is the greater the vacuum drag. In a compressor rotating at high speed without the benefit of ram air to fill the vacuous space the resulting drag becomes the greatest power-consuming factor in its operation. Therefore, any minimizing of this effect will reflect in the over-all efficiency of the compressor.

The compressor wheels shown in the accompanying drawings may be driven by or coupled to any type of prime mover, such as a steam turbine, an electric motor, a geared-up reciprocating engine or a gas turbine. Obviously, its need is greatest in the latter field.

In the drawings:

Fig. 1 is a frontal, composite view of the compressor taken on the lines 1—1, Fig. 8.

Fig. 2 is an enlarged view of a single recess, together with side indentations, formed in the forward wall of the rotor's disc for the housing of the base and lugs of a single vane structure, shown in Figs. 1, 6, 8 and 17.

Fig. 3 is a top view of a section of the disc showing in part the base of a structure and, the hooded part of said structure, taken on the lines 3—3, Fig. 7.

Fig. 4 is a three-quarter view of a U-channel member taken on the lines 4—4, Fig. 6.

Fig. 5 is a sectional view showing the construction of a concavo-concave vane structure and its lugs, taken on the line 5—5, Fig. 6.

Fig. 6 is a three-quarter view of a single vane structure showing the pumping side thereof, the deflecting side, the hood formation and the U-channel member.

Fig. 7 is an enlarged side view of a single concavo-concave vane structure, showing its base mounted in position within its recess in the forward face of the disc.

Fig. 8 is a cross-sectional side view of the complete compressor, showing the components thereof in position and the flow of air therethrough.

Fig. 9 is a half-size, external side view of the compressor.

Fig. 10 is a composite view of the compressor, looking from the rear, taken on the lines 10—10, Fig. 8.

Fig. 11 is a partial view of a disc showing frontally a number of recesses in the forward face thereof.

Fig. 12 is a three-quarter view of the spider formation identified as 34 in this view and in Fig. 8, in functioning position.

Fig. 13 is a partial three-quarter view of plate 13, which carries a plurality of nozzles 12, Figs. 3, 7, 8, 13 and 14.

Fig. 14 is a partial view, looking downward, on the rim of flange 24 mounted in a recess in disc 8 and shown in Fig. 8.

Fig. 15 is a partial view of flanged rim 24 shown in position in Fig. 8.

Fig. 16 is a partial view of the interstage cooling means, taken on the lines 16—16, Fig. 8.

Fig. 17 is an enlarged view of a group of concavo-concave vane structures shown in Fig. 1. Arrows show their construction and functioning.

Arrows are employed freely in the several views to assist in visualizing the flow of air under compression into, through and out of the compressor.

The construction of vanes 1 may be observed by referring to the cross-sectional view of Fig. 5. 1A identifies the attack, or pumping side of the vanes, 1B the deflecting side, while 1C represents the base of which the vane structures per se are an integrally formed part. As aforesaid, Fig. 5 is a view taken on the lines 5—5, of Fig. 6, showing the double concave structure.

Upon high-speed rotation, which is essential to attain maximum compressor efficiency, the attack side of the vane (1A) becomes a powerful centrifugal pump, throwing free air radially under heavy pressure against the radial roof of hooded section 1D, which is a continuation of pumping vane 1A. To replenish the air so pumped, new air rushes into the vanes as per arrows 2, Fig. 8.

As will be readily understood, deflecting vane 1B shown clearly in Fig. 6 plays a very important power-saving role in the operation of this compressor, minimizing the vacuum drag that otherwise would seriously impede the movement of pumping vanes 1A through the air. This is doubly important in the event that this compressor is employed to deliver air to a stationary gas turbine engine. In this case, the effect of ram pressure air met in forward flight would not be present and the resulting vacuous drag on the trailing side of the vanes would consume a great deal of power. Hence, the value of streamlining the back of each vane structure to minimize the drag caused by the sudden displacement of air.

If, on the other hand, the compressor is mounted on the shaft of a gas turbine employed in the turboprop or jet propulsion fields, the ram air encountered in forward flight, by being deflected off the trailing side of the vane structures, would play a very important part in minimizing the power required to rotate the compressor at its most efficient speed. For, as will be observed notably in Fig. 17, whereas the direction of rotation is as per arrow 3, the air encountered in flight, after imparting its windmilling effect to the trailing side of the structure, is deflected off its curving surface into the pumping side of the vane following next in rotation. The ram pressure so encountered would amount to many pounds per square inch of surface, all depending upon the speed of forward flight. This deflection is indicated by a plurality of arrows 4, Fig. 17. Also, part of the air encountered in flight would be centrifuged off the tip of deflecting surface 1B, as per arrow 5, into U-channel member 6 for conveyance into hood 1D of the vane following next in rotation.

As will be seen by referring to Figs. 1, 6, 8 and 17, hood 1D is turned at a right angle relative to pumping vane 1A and faces in a direction opposite to that of rotation; also, that this hood reduces progressively in cross section toward its discharge orifice 1E, which communicates with oblique channels 7 formed through base 1C of each vane structure and through the wall of disc 8, as shown in Figs. 7 and 8 and especially in top view, looking downward, in Fig. 3.

Recesses 9, of which there are a plurality as shown in Fig. 11 and in a three-quarter single view, Fig. 2, are formed in the forward side of disc 8 and, as will be seen, are tapered from near the center of the disc to within close proximity of its periphery. Indentations are also formed on each side of the recess for the occupancy of stress-supporting lugs 1CC of the vane structures.

Mounting of the base section 1C of said vanes in these recesses is shown in side views in Figs. 7 and 8. This lug-supporting method of securing the vane bases in recesses promotes ease of manufacture and affords great structural strength. These bases are fixed in position in their recesses by screw bolts 10, shown in dotted outline in Figs. 3, 7 and 8.

By virtue of their constricting formation, hoods 1D become compression chambers for the air centrifuged into them by the pumping vanes. These hoods take the place of diffuser ducts in conventional centrifugal compressors, said hoods making it possible to obtain compression of the air while confining it to the peripheral boundaries of the disc.

Figs. 3, 7 and 8 show channel 7, a converging entrance thereof being formed through base 1C of the vane structure, while the throat of the channel extends through the disc's wall to communicate with a nozzle 12, which is formed in plate 13, Figs. 3, 8, 13 and 14.

Plate 13 seats in a recess formed in the rear wall of disc 8, to which it is removably secured by a plurality of screw-bolts 14, shown in Fig. 13. Such removal permits the substitution of other plates carrying nozzles of different contours or discharge angles to permit the employment of the most efficient design.

By referring to Figs. 1, 6, 7, 8 and 17, it will be seen that the pumping side of vanes 1A have a minor curvature commencing near the center of disc 8 and extending progressively radial into a major curvature to merge with hooded section 1D. As indicated by arrows 2, Figs. 7 and 8, free air enters these vanes throughout their entire length and becomes trapped by centrifugal force induced by high-speed rotation, which results in a very considerable build-up of pressure in hood 1D. Once trapped, the air cannot oppose the pressures induced by the combined high-speed rotation and the centrifugal pumping action. Due to the restrictions imposed by the progressively decreasing cross section of the hood and the size of orifice 1E, the air may be compressed several atmospheres prior to its leaving the confines of the hood. Whereupon it enters channel 7 wherein, due to the reduced cross section of said channel, its compression pressure becomes changed into velocity pressure and then, by means of diverging nozzles 12, leaves the rotor at a speed greatly in excess of the rotor's peripheral speed in a direction opposite to that of rotation, thereby creating a powerful reactive drive for minimizing the power required to build up the desired compression ratio.

Disc 8, shown in cross section in side views in Figs. 3, 7 and 8, is keyed as at 15 to shaft 16, which is mounted between bearing assemblies 17 at its forward end and 18 at its rear, which assemblies are secured in position on the shaft by locknuts 19 and 20 respectively, Figs. 1 and 8. These bearing assemblies are, in turn, supported by the hubs of the forward and rear open framework structures 21 and 22, which may be secured by conventional means to casing 23.

Casing 23 is of twin-half construction, the halves thereof being secured by a plurality of screw-bolts 23B. Casing 23A is likewise of twin-half construction, its halves being secured to each other by a plurality of screw-bolts 23C, Fig. 1.

Having described my invention, I claim:

1. In a centrifugal fluid compressor, a casing, a rotor mounted therein for powered rotation and adapted to be assisted by ram pressure of air induced by the forward motion of said casing therethrough and by the discharge of air compressed therein in a direction opposite to that of rotation of said rotor, said rotor comprising a disc having a forward and a rear wall, a plurality of recesses formed in said forward wall, a like number of concavo-concave structures having inner and outer radial ends, said structures having bases removably secured in said recesses, each of said structures projecting forwardly into free air and having opposite sides, a curved vane facing in the direction of rotation on one side of each of said structures for pumping air radially outward and on the opposite side of each of said structures a concave surface for deflecting ram pressure air encountered in the forward movement of said casing into the pumping vane following next in rotation, each of said pumping vanes curving at the outer radial end to form a right angular tubular hood for the compression of air pumped by said concaved vane, said hood having a discharge end open to form an orifice thereat and said hood having an intake end of a cross sectional area larger than that of said discharge end, a plurality of channels extending diagonally through said disc one communicating with each of said orifices, an annular recess formed in the rear wall of said disc adjacent the periphery thereof and an annular plate formed to fit said recess, a plurality of nozzles extending through said plate, each nozzle communicating with one of said channels and having a diverging cross section toward the discharge end thereof and said nozzles being inclined axially in a direction oppositely of the rotation of said rotor for discharging the air compressed in said hood in a direction opposite to the rotation of said rotor.

2. In a centrifugal compressor as described in claim 1, each of said concavo-concave structures protruding from the forward side of said disc a minor distance at its inner end and relative to said minor distance a major distance at its radial end, one of said structure's sides having a concave surface that increases in area from its inner to its radial end for pumping air radially outward, the opposite side of said structure having a concavo curvature that commence at the structure's minor protuberance and increases in extent as the structure's radius increases, said opposite side deflecting in a direction opposite to that of rotation into the pumping side of the vane following next in rotation ram pressure air encountered in the forward movement of said casing.

3. In a centrifugal fluid compressor, an open-end casing adapted to move forward through air, a disc mounted on a shaft for rotation in said casing, a plurality of tapered recesses formed in the forward wall of said disc, the taper of said recesses commencing near the center of the disc and continuing radially to within close proximity of the periphery thereof, a plurality of concavo-concave structures having bases for fitting into said recesses and projecting forwardly there from into free air, one side of said structures having a concave vane and relative to said vane a tubular hood formed right angularly at the radial end thereof for receiving air pumped by said vane, said tubular hood continuing convergingly in a direction opposite to the rotation of said rotor and terminating in a construction forming an orifice, the opposite side of said structure having an oppositely faced concaveness commencing at the advanced protuberance thereof and retreating toward the forward wall of the disc for minimizing the vacuous drag following the movement through air of said pumping vane, said oppositely faced concaveness increasing in width as the radius thereof increases for deflecting in a direction opposite to that of rotation into the vane following next in rotation air encountered in the forward movement of said casing therethrough, a plurality of channels extending diagonally through said disc, each channel communicating with one of said orifices for conveying said compressed air therefrom, an annular recess formed in the rear wall of said disc inwardly of its periphery, a circular plate fitting said recess, a plurality of nozzles having communication with said channels, extending through said plate and being mounted at a radius co-equal with that of said orifices, said nozzles having a diverging construction for discharging said compressed air in a direction opposite to that of rotation, a stator formation positioned in close proximity to said nozzles for receiving said air thereagainst and deflecting it axially therefrom.

4. In a centrifugal fluid compressor having an open-end casing adapted to move forward through air, a disc fixed to a shaft for rotation in said casing, said disc having in its forward wall a plurality of radially disposed recesses and indentations extending sidewise therefrom, a plurality of structures having bases for fitting said recesses and lugs for fitting said indentations, said structures projecting forwardly and having oppositely curved sides comprising vanes, the vane advancing in the direction of rotation being concaved for pumping air radially outward, and the opposite pumping vane being concaved for deflecting into the pumping vane of the structure advancing next in rotation ram air encountered during the forward movement of said casing, said structures commencing near the center of said disc and increasing in depth and width as their radii increases, a tubular hood formed on the radial end of said pumping vane for compressing said air, said hood turning at a right angle facing opposite to the direction of rotation and converging to form relative to the intake end thereof a smaller diametered end terminating to form an orifice thereat a U-channel member integrated with the inner side of each hood for collecting air centrifuged off the outer end of said deflecting vane and conveying it into the hood of the pumping vane advancing next in rotation, a rearwardly extending, angularly disposed air-flow channel formed through said base at a radius co-equal with that of said orifice and having communication therewith, an annular recess formed in the rear wall of said disc near its periphery, a plate removably secured in said recess, a plurality of nozzles secured in said plate, each nozzle communicating with one of said channels, said nozzles protruding outwardly from said plate and having a diverging construction for discharging said air in a direction substantially opposite to that of rotation, a ring-like wall positioned around the inner wall of said casing in close proximity to said disc, said ring-like wall having a flange extending inwardly to within close proximity of said nozzles for establishing a close tolerance relation between said disc and said casing.

5. In a centrifugal compressor as described in claim 4, a plurality of concavo-concave structures each having tubular walls defining a hood having a maximum cross sectional area immediately radial to said pumping vane, a round back roof formed on the underside of said hood for receiving thereagainst the discharge of air centrifuged from said pumping vane and turning said air therewithin in a direction opposite to that of rotation, the walls comprising said hood converging to form an orifice having lesser cross sectional area than the area immediately radial to said pumping vane, a chamber formed by said converging walls for the compression of said air prior to its discharge through said orifice in said opposite-to-rotation direction.

6. In a centrifugal compressor as described in claim 4, each of said structures having a base removably secured in the forward wall of said disc, a channel formed diagonally through said base adjacent its periphery for communicating with the discharge orifice of each structure, said channel continuing through the wall of said disc in a direction substantially opposite to that of rotation at a radius co-equal with that of said orifice, said channel having a converging entrance for changing compression pressure in the air received from its respective structure into velocity pressure, an annular recess formed in the rear wall of said disc inwardly of its periphery, a circular plate having means for being secured in said recess, a plurality of diverging nozzles secured to said plate and extending diagonally outward therefrom, each nozzle communicating at its intake end with one of said channels for the discharge therethrough of said air in said opposite-to-rotation direction.

7. In a centrifugal compressor as described in claim 4, a disc having a plurality of recesses formed in the forward wall thereof, each of said recesses being of tapered formation, the taper thereof commencing near the center of said disc and extending to a radius inwardly of its periphery, each of said recesses having a plurality of indentations stemming at right angles therefrom into the wall of said disc, a plurality of vane structures each having a base conforming to the shape of said recesses and a plurality of lugs on the sides thereof for occupying said indentations, means for securing in its respective recess each of said structures to said disc.

8. In a centrifugal compressor as described in claim 4, a disc having an annular recess formed in the rear side thereof inwardly of its periphery, a removable plate shaped to fit said recess and means for securing said plate therein, a plurality of nozzles having a curving and diverging construction, said nozzles extending diagonally through said plate and protruding outwardly from the side thereof to face substantially in a direction opposite to that of rotation, said nozzles being mounted in said plate at a radius co-equal with that of the discharged orifices of said hoods for the axial discharge of said air therefrom.

9. In a centrifugal compressor as described in claim 4, an intercommunicating U-channel member fixed to the innermost side of each hood of said structures, said member extending relative to the direction of rotation between the wall of a pumping vane that trails relative to the direction of rotation and the advancing wall of the pumping vane following next in rotation, said member being secured at each of its ends to said walls and being inverted relative to said shaft to form a canopy over the deflecting vane of said structure, said deflecting vane terminating short of said inverted channel and centrifuging air into said channel for conveyance into the hood of the pumping vane advancing next in rotation.

10. In a centrifugal fluid compressor having an open-end casing adapted to move forward through air, a disc secured to a shaft and mounted for rotation in said casing, said disc having a plurality of air pumping and compressing structures projecting forwardly into said air, each structure having a base section formed integrally therewith, recesses formed in the forward wall of said disc for housing said bases, said structures having a concave side open in the direction of rotation for pumping air radially outward and a curving side for deflecting air encountered in the forward movement of said casing into the pumping side of the structure following next in rotation, each of said pumping sides being capped by walls forming a hood extending right angularly in a direction opposite to the direction of rotation, said hooded walls converging to form an orifice having a lesser cross sectional area than the area immediately radial to said pumping side, a channel communicating with each of said orifices and extending diagonally through its respective base and through the wall of said disc at a radius co-equal with that of said orifice, an annular recess formed in the rear wall of said disc and a plate formed to fit flushingly therein, a plurality of nozzles, each communicating with a channel, extending through said plate and protruding outwardly therefrom for discharging said air in a direction substantially opposite to that of rotation, a ring-like wall secured to the inner wall of said casing, said wall having a flange extending inwardly to form a close tolerance relation between said disc and said casing, said wall being open on the side distant from said disc for directing axially the air discharged in said opposite-to-rotation direction from said nozzles.

References Cited in the file of this patent

UNITED STATES PATENTS

| | | |
|---|---|---|
| 1,447,916 | Watkins | Mar. 6, 1923 |
| 1,540,886 | Huff | June 9, 1925 |
| 1,670,065 | Eisenwinter | May 15, 1928 |
| 1,689,671 | Jude | Oct. 30, 1928 |
| 1,824,839 | Ross | Sept. 29, 1931 |

FOREIGN PATENTS

| | | |
|---|---|---|
| 33,489 | Switzerland | Feb. 26, 1905 |
| 77,392 | Sweden | May 30, 1933 |